United States Patent [19]
Richardson et al.

[11] Patent Number: 5,862,009
[45] Date of Patent: Jan. 19, 1999

[54] MAGNETIC TAPE DRIVE HAVING DIRECT DRIVE MOTOR AND EXTENDED HEAD TRAVEL

[75] Inventors: Kenneth G. Richardson, Fort Collins; Gregory A. Standiford, Loveland, both of Colo.

[73] Assignee: Hewlett-Packard Company, Palo Alto, Calif.

[21] Appl. No.: 922,508

[22] Filed: Sep. 3, 1997

Related U.S. Application Data

[62] Division of Ser. No. 639,535, Apr. 29, 1996, Pat. No. 5,712,745, which is a continuation of Ser. No. 528,180, Sep. 14, 1995, abandoned, which is a continuation of Ser. No. 282,126, Jul. 28, 1994, abandoned.

[51] Int. Cl.$^6$ .............................. G11B 5/55; G11B 5/56; G11B 15/32
[52] U.S. Cl. ........................................................ 360/96.1
[58] Field of Search .................... 360/93, 96.1, 96.3, 360/98.07, 99.04, 99.08, 109

[56] References Cited

U.S. PATENT DOCUMENTS

| | | | |
|---|---|---|---|
| 5,210,664 | 5/1993 | Perona | 360/93 |
| 5,304,878 | 4/1994 | Oda et al. | 360/99.04 X |
| 5,712,745 | 1/1998 | Richardson et al. | 360/96.1 |

*Primary Examiner*—William R. Korzuch
*Attorney, Agent, or Firm*—Augustus W. Winfield

[57] ABSTRACT

A magnetic tape drive having a motor with a magnetically shielded cavity or hole in one cover of the motor providing additional room for movement of a magnetic head. The cavity eliminates a mechanical interference problem, enabling direct drive of a roller (puck) combined with short overall drive height. In motors having an internal stator, some of the stator poles are eliminated and a magnetically shielded cavity is provided in the area where the stator poles are eliminated. In motors having an external stator, no stator modification is required and a shielded cavity provides access into an open area of the rotor. In addition, for motors having an external stator and sufficient magnetic shielding, a simple hole in one cover of the motor may be sufficient rather than a magnetically shielded cavity.

2 Claims, 9 Drawing Sheets

MAGNETIC TAPE DRIVE HAVING DIRECT DRIVE MOTOR AND EXTENDED HEAD TRAVEL

This is a divisional of application Ser. No. 08/639,535 filed on Apr. 29, 1996, now U.S. Pat. No. 5,712,745, which is a continuation of application Ser. No. 08/528,180 filed on Sep. 14, 1995, now abandoned, which is a continuation of application Ser. No. 08/282,126 filed on Jul. 28, 1994, now abandoned.

FIELD OF INVENTION

This invention relates generally to magnetic tape drives and more specifically to capstan drive motors and magnetic head positioning.

BACKGROUND OF THE INVENTION

In 1972, a belt driven tape cartridge design (U.S. Pat. No. 3,692,255, issued to Robert A. Von Behren) was introduced for use in the computer industry for digital tape recording. Cartridges commonly in use in 1972 were approximately 100 mm by 150 mm and the magnetic tape was 6.35 mm (0.250 inches) wide. Cartridges of that size and corresponding drive mechanisms are still commercially available. In 1976, smaller data cartridges were developed, as described by Alan J. Richards, Mini Data Cartridge: A Convincing Alternative for Low-Cost, Removeable Storage, Hewlett-Packard Journal, May, 1976. The mini-cartridge size is 63.5 mm by 82.5 mm. Versions of the mini-cartridge are commercially available from a variety of vendors with tape widths varying from 3.81 mm (0.150 inches) to 6.35 mm (0.250 inches). New versions of mini-cartridges have been proposed having a tape width of 8.00 mm (0.315 inches). The external dimensions of the proposed cartridges are identical to existing mini-cartridges but there are numerous internal changes to accommodate wider tape.

Both sizes of cartridges described above have two openings in one edgewall. The first opening provides access to the tape by a magnetic head. The magnetic head travels across the width of the tape, transverse to the direction of tape movement, accessing one track at a time for reading or writing. The second opening provides access to a driven roller (capstan) inside the cartridge by an external driving roller (puck) in the drive mechanism. The external driving roller (puck) is rotated by a motor in the drive mechanism. In full height drives and half-height drives, the external driving roller (puck) is typically driven directly by the drive motor. As drive height decreases, there may be a mechanical interference between the drive motor and the magnetic head. The interference problem is made even worse with the proposed cartridges having a tape width of 8.00 mm (0.315 inches), increasing the distance the magnetic head has to travel. Therefore, in newer shorter height drives, the drive motor is typically displaced relative to the driving roller (puck) and connected to the driving roller (puck) by a belt or an intermediate roller. For example, see U.S. Pat. No. 5,210,664 issued to Mark W. Perona on May 11, 1993. Belts and intermediate rollers add cost and may slip or cause other speed problems. A direct drive is desirable as the lowest cost and most reliable way of connecting the drive motor to the driving roller (puck). A drive mechanism is needed that has both a directly driven roller (puck) and room for full movement of the magnetic head.

SUMMARY OF THE INVENTION

A tape drive mechanism is provided having a directly driven drive roller (puck) and room for full movement of the magnetic head. Two embodiments are provided, a first embodiment with drive motors having an external stator and a second embodiment with drive motors having an internal stator. In drives having a drive motor with an internal stator, part of the stator is removed and a magnetically shielded area is provided in the evacuated stator area for head travel. In some drives having a drive motor with an external stator, a simple hole is provided in the motor cover to permit the head to travel into the motor cup.

DETAILED DESCRIPTION OF THE PREFERRED EMBODIMENT OF THE INVENTION

Figure 1:
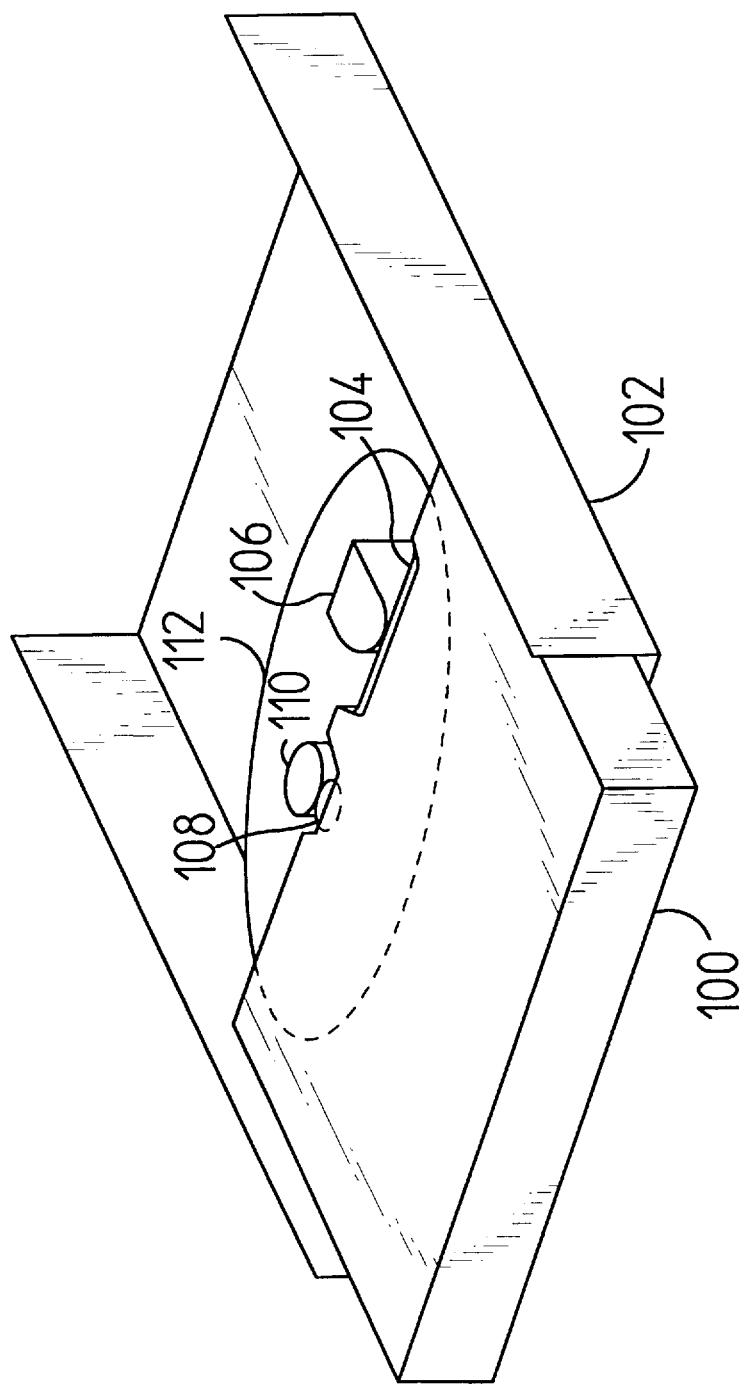
FIG. 1 is a perspective view of a tape cartridge and chassis.

FIG. 1 illustrates a tape cartridge 100 inserted in a drive 102. A magnetic tape 104 in the tape cartridge 100 is in contact with a magnetic head 106 in the drive 102. A driven roller (capstan) 108 in the tape cartridge is in contact with a driving roller (puck) 110 in the drive 102. The driving roller (puck) 110 is driven by a motor 112.

Figure 2A:
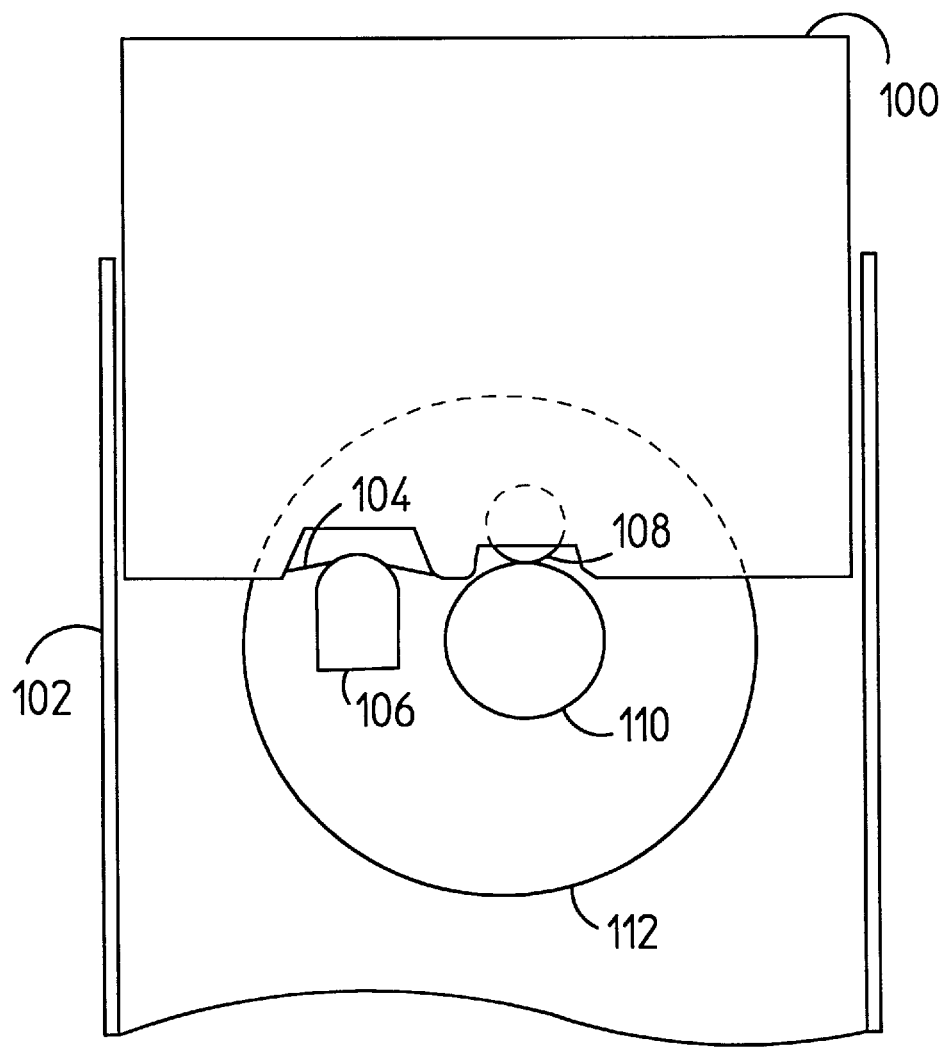
FIG. 2A is a top view of a portion of the tape cartridge and chassis of FIG. 1.

FIG. 2A is a top view of the components illustrated in FIG. 1. As in FIG. 1, the magnetic tape 104 in the tape cartridge 100 is in contact with the magnetic head 106 in the drive 102. The driven roller (capstan) 108 in the tape cartridge is in contact with the driving roller (puck) 110 in the drive 102. The driving roller (puck) 110 is driven by the motor 112. Note that in the configuration illustrated in FIG. 2, the motor 112 extends beyond the head 106 so that movement of the head 106 is potentially constrained, depending on the height of the various components.

Figure 2B:
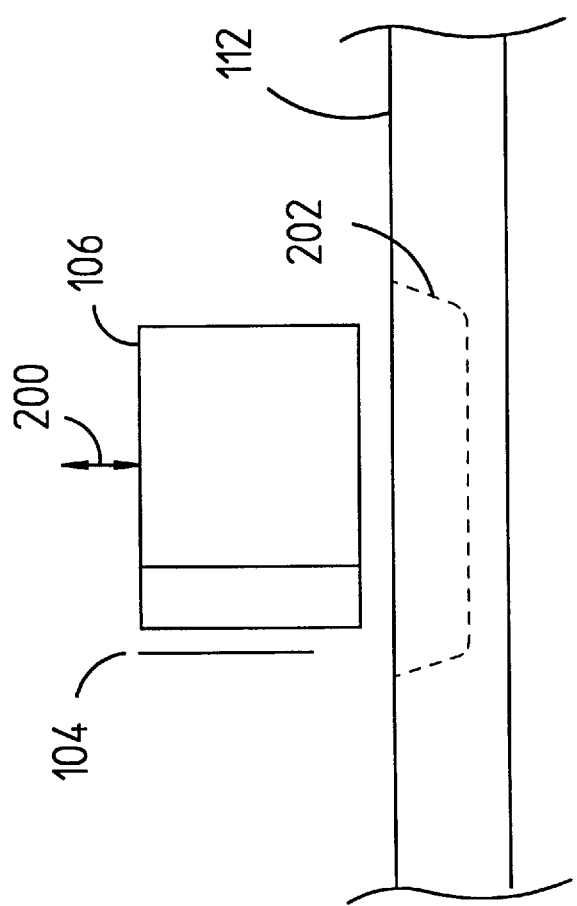
FIG. 2B is a side view of a portion of the tape cartridge and chassis of FIG. 2.

FIG. 2B is a side view of just the tape 104, the head 106 and a portion of the motor 112. As illustrated in FIG. 2B, the direction of movement of the head 106 is as depicted by the double-ended arrow 200. If the motor 112 extends below the head 106 as in FIG. 2B, the motor 112 limits the distance the head 106 can travel. Providing the required head travel limits the height of the overall drive mechanism. In the invention, the head 106 is permitted to travel into the body of the motor, either into a magnetically shielded area such as a cavity or depression as depicted by dashed line 202 or through a simple hole in a top cover of the motor.

Figure 3A:
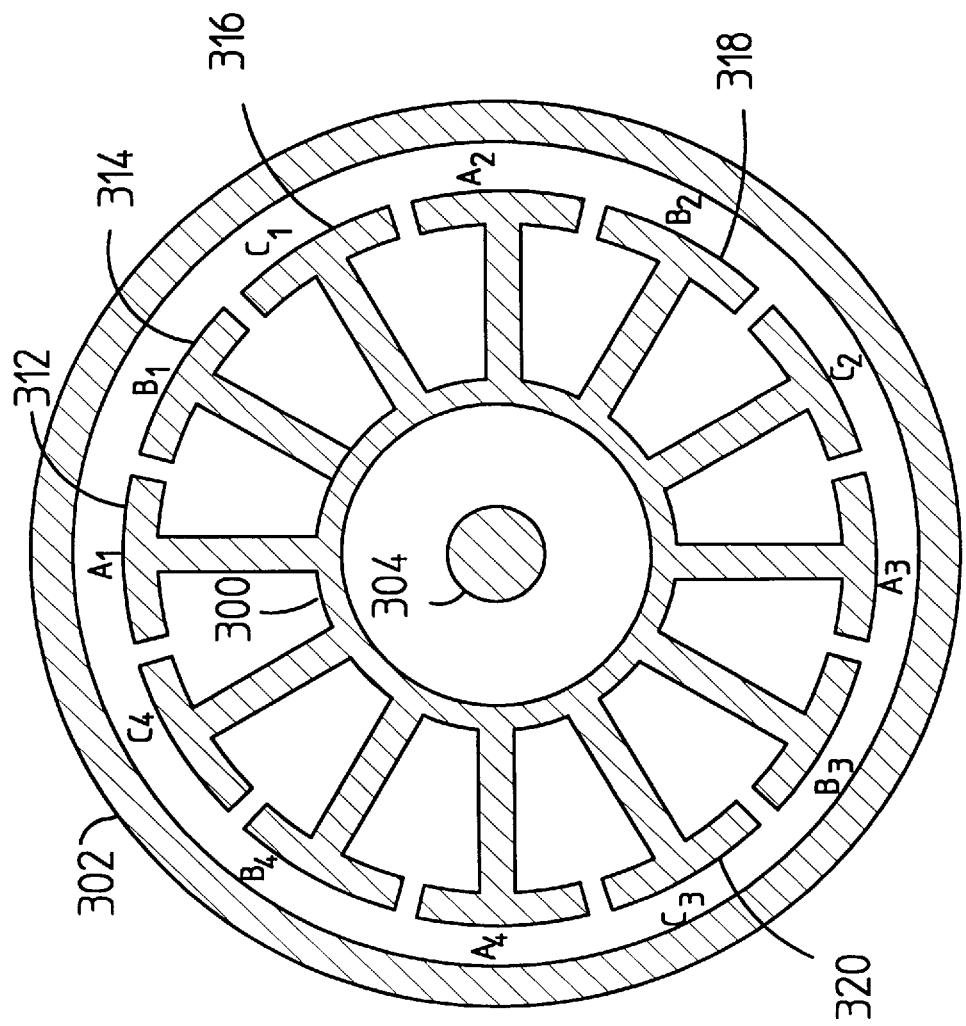
FIG. 3A is a cross section of a motor having an internal stator.
Figure 3B:
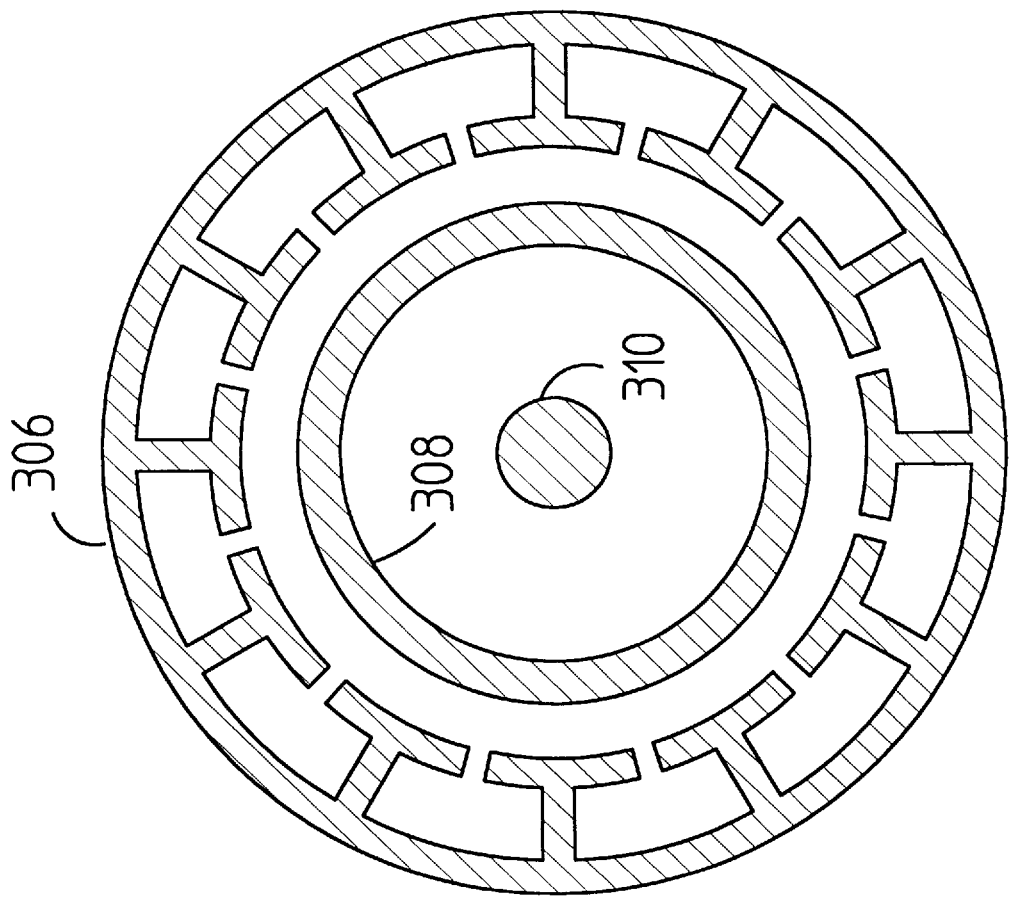
FIG. 3B is a cross section of a motor having an external stator.

FIGS. 3A and 3B illustrate simplified cross sections of a type of motor commonly used in tape and disk mechanisms. For purposes of illustration, the motors in FIGS. 3A and 3B are depicted as three-phase brushless DC motors having 12 stator poles, but other variations of numbers of phases and numbers of poles are equally suitable. In FIG. 3A, a stator 300 has coils of wire (not illustrated) wound around magnetic poles to form electromagnets. A rotor 302 has multiple permanent magnetic areas. The rotor 302 is connected by a cup shaped cover to an internal shaft 304. Note in FIG. 3A that the illustrated stator has 12 stator poles labeled $A_1$–$A_4$, $B_1$–$B_4$ and $C_1$–$C_4$. The stator poles are wired so that there are four poles (for example $A_1$–$A_4$) for each of three electrical phases (A,B,C). All poles for each electrical phase are wired together. For example, for phase A, poles $A_1$–$A_4$ are all energized. As each phase is sequentially energized, the permanent magnetic areas in the rotor follow. For example, in FIG. 3A, electromagnetic poles $A_1$–$A_4$ may be energized so that opposite polarity permanently magnetized areas in the rotor 302 are aligned with each of the phase A poles. Then, if poles $A_1$–$A_4$ are turned off and poles $B_1$–$B_4$ are energized, the rotor 302 will rotate clockwise to align with the phase B poles. Likewise, poles $B_1$–$B_4$ may then be turned off and poles $C_1$–$C_4$ energized.

In the invention, for internal stator motors as illustrated in FIG. 3A, the motor is constructed with a stator in which selective motor poles are eliminated to make room for head travel. If a single pole (for example pole $A_1$ (312)) is eliminated, the motor will still rotate but one electrical phase (for example phase A) will have less torque than the other two phases. To ensure torque balance, an equal number of poles from each of the electrical phases must to be eliminated. Therefore, if pole $A_1$ is eliminated, then one member of the set of poles $B_1$, $B_2$, $B_3$ and $B_4$ must be eliminated and one member of the set of poles $C_1$, $C_2$, $C_3$ and $C_4$ must be eliminated. Three adjacent poles may be eliminated, for example $A_1$ (312), $B_1$ (314) and $C_1$ (316). Clearly, other combinations are also possible, such as $A_1$ (312), $C_1$ (316), $B_2$ (318) or $A_1$ (312), $B_2$ (318), $C_3$ (320). In each of the combinations, the rotational torque is balanced but there are asymmetrical forces on the rotor causing some force on the bearings transverse to the direction of rotation. With adequate bearings, there is no significant wobble of the rotor 302.

FIG. 3B illustrates a motor having an external stator 306, an internal rotor 308, and the internal rotor attached to a central shaft 310. As will be discussed below in conjunction with FIG. 7, an external stator motor can be modified to accommodate additional head travel without requiring modification of the stator.

Figure 4:
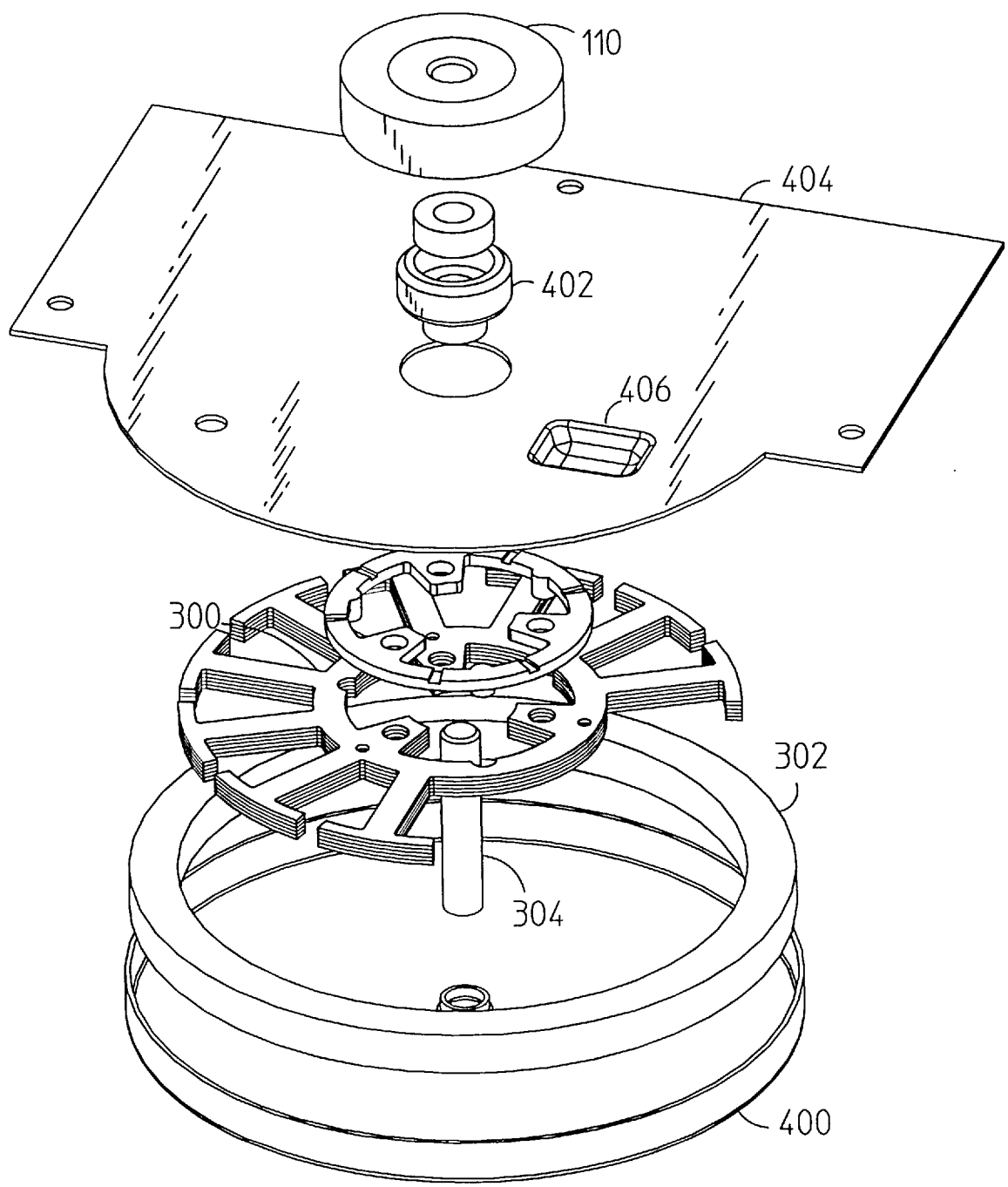
FIG. 4 is a perspective view of a motor having an internal stator with a first alternative for a portion removed to accommodate travel of the magnetic head.

FIG. 4 illustrates a motor with an internal stator as in FIG. 3A and with three adjacent poles eliminated. That is, FIG. 4 corresponds to elimination of $A_1$ (312), $B_1$ (314) and $C_1$ (316) in FIG. 3A. Note in FIG. 4 that a cup 400 connects the rotor 302 to the central shaft 304. FIG. 4 also illustrates a bearing assembly 402. In conjunction with the invention, the motor is covered with a top cover 404 made of a material such as steel or other material capable of isolating the magnetic head from electromagnetic fields inside the stator 300. A cavity or depression 406 (corresponding to FIG. 2B, 202) is formed in the top cover 404 to permit the magnetic head to travel into the stator area where the poles have been eliminated. The area for receiving the head is depicted as a formed depression 406, but a metal cylinder or box with an enclosed end or any other magnetically shielded shape may be used as long as the head can penetrate into the body of the motor and as long as the area for receiving the head does not interfere with operation of the motor.

Figure 5:
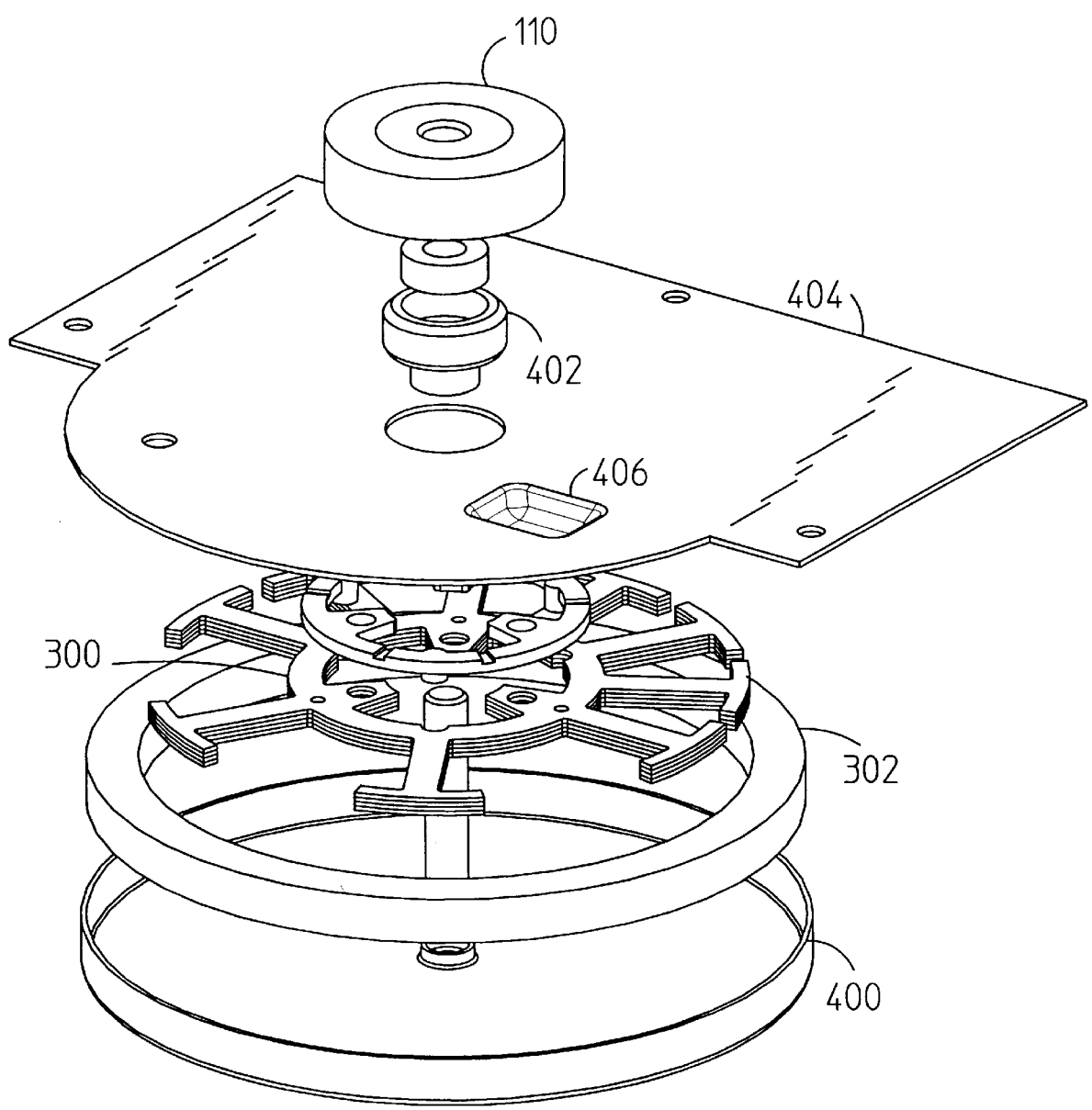
FIG. 5 is a perspective view of a motor having an internal stator with a second alternative for a portion removed to accommodate travel of the magnetic head.
Figure 6:
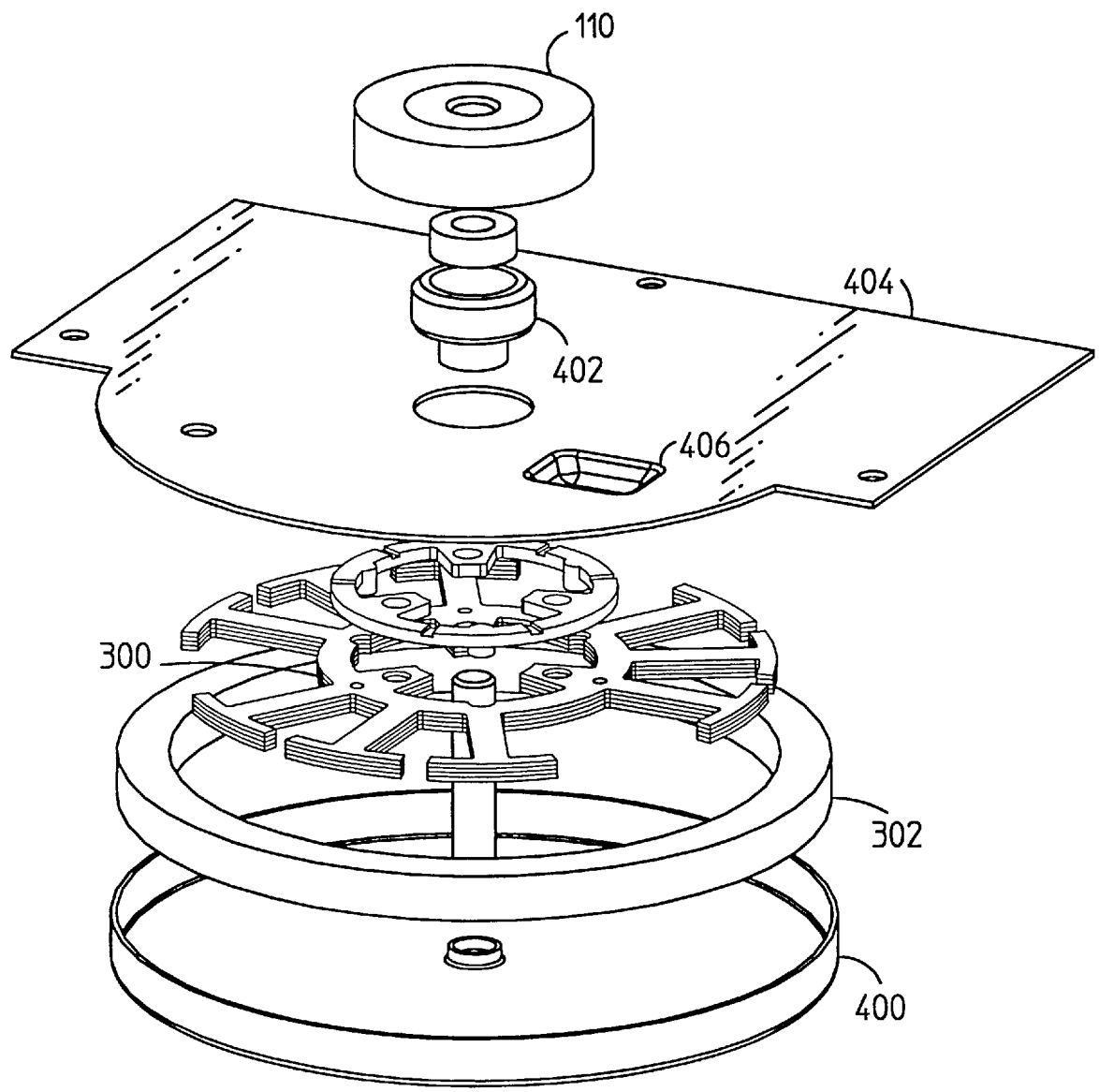
FIG. 6 is a perspective view of a motor having an internal stator with a third alternative for a portion removed to accommodate travel of the magnetic head.

FIGS. 5 and 6 illustrate a motor as in FIG. 4 but with different combinations of stator poles eliminated. FIG. 5 corresponds to elimination of every other pole such as poles $A_1$ (312), $C_1$ (316), $B_2$ (318) in FIG. 3A. FIG. 6 corresponds to elimination of every fourth pole such as poles $A_1$ (312), $B_2$ (318), $C_3$ (320) in FIG. 3A.

Figure 7:
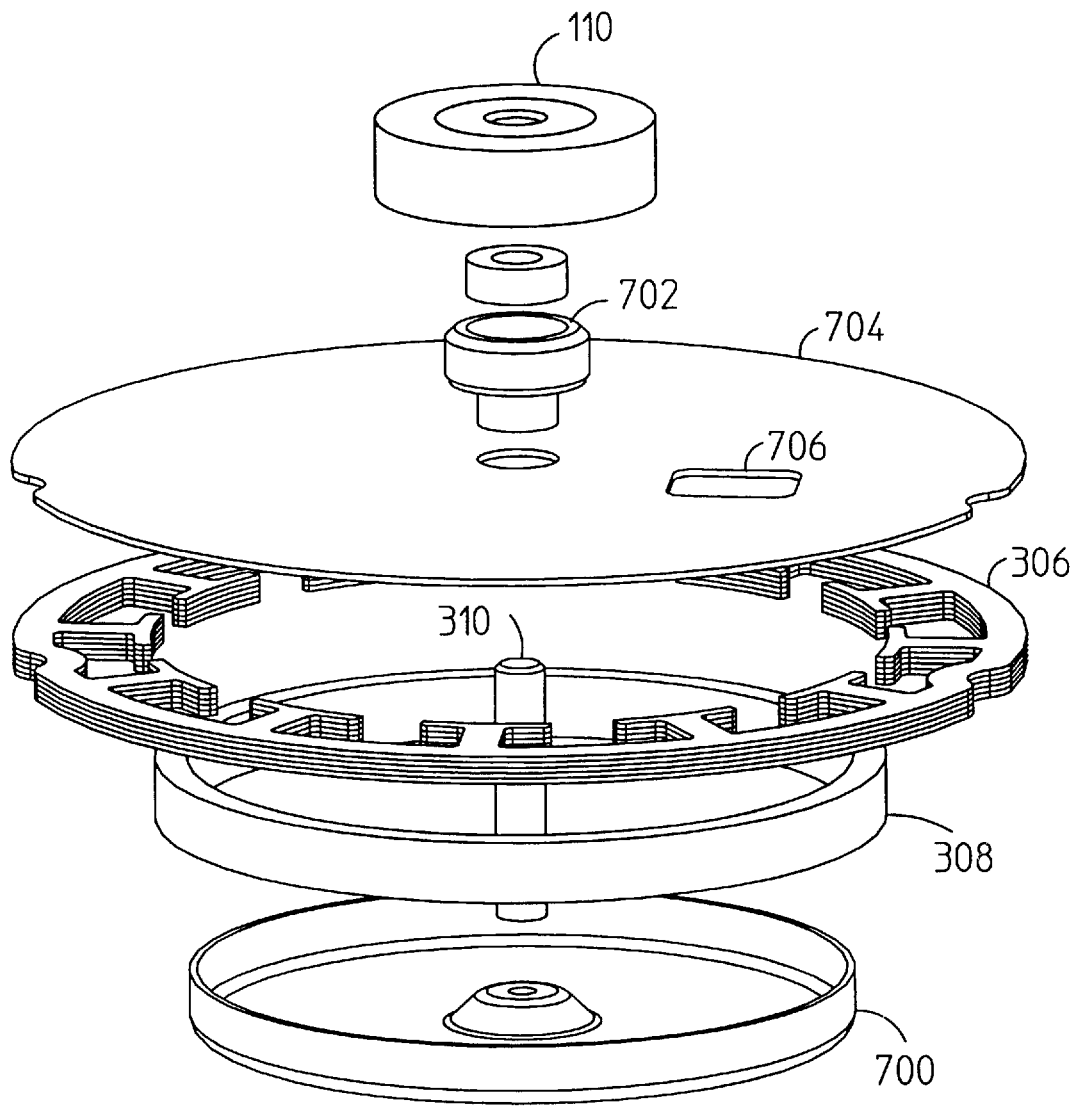
FIG. 7 is a perspective view of a motor having an external stator with an opening inside the rotor to accommodate travel of the magnetic head.

FIG. 7 illustrates an external stator motor as in FIG. 3B. As illustrated in FIG. 7, a cup 700 inside the rotor 308 connects the rotor 308 to the central shaft 304. FIG. 7 also illustrates a bearing assembly 702. Typically, the cup 700 is made of a material such as steel that isolates the interior of the cup 700 from electromagnetic fields resulting from permanent magnetic areas of the rotor 308 and from the stator 306. Therefore, for an external stator of sufficient diameter and sufficient shielding, a simple hole 706 in the top cover 704 permits the magnetic head to travel into the interior of the motor. No modification of the stator 306 is required. If the cup 700 does not provide adequate shielding, a formed cavity or depression may be used as in FIG. 4, 406.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A magnetic tape drive comprising:

a magnetic head, the magnetic head being moveable with a range of movement;

a motor, adjacent to the magnetic head the motor including a rotor and a stator, the stator positioned external to the rotor, the rotor having a plane of rotation;

a rotating cup in the motor, attached to the rotor, having an open area towards the magnetic head;

a cover on the motor, between the open area of the rotating cup and the magnetic head; and a hole in the cover, the hole positioned so that at least part of the range of movement of the magnetic head is through the hole and into the open area of the rotating cup in the motor, transverse to the plane of rotation of the rotor, thereby reducing a dimension of the magnetic tape drive transverse to the plane of rotation of the rotor.

2. A magnetic tape drive as in claim 1 further comprising:

the tape drive adapted to receive a tape cartridge having a drive roller internal to the tape cartridge, the drive roller being driven directly by the motor.

* * * * *